(12) United States Patent
Vacchi et al.

(10) Patent No.: US 11,934,800 B2
(45) Date of Patent: Mar. 19, 2024

(54) GENERATING METADATA TO FACILITATE CODE GENERATION

(71) Applicant: Red Hat, Inc., Raleigh, NC (US)

(72) Inventors: Edoardo Vacchi, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 23 days.

(21) Appl. No.: 17/752,749

(22) Filed: May 24, 2022

(65) Prior Publication Data
US 2023/0385029 A1    Nov. 30, 2023

(51) Int. Cl.
G06F 8/30 (2018.01)

(52) U.S. Cl.
CPC .................................... G06F 8/30 (2013.01)

(58) Field of Classification Search
None
See application file for complete search history.

(56) References Cited

U.S. PATENT DOCUMENTS

| | | | |
|---|---|---|---|
| 6,742,175 B1 | 5/2004 | Brassard | |
| 8,402,064 B2 | 3/2013 | Addala et al. | |
| 10,698,668 B1 | 6/2020 | Pohlack et al. | |
| 10,867,351 B1 | 12/2020 | Vadaparty et al. | |
| 2009/0164972 A1* | 6/2009 | Ruan | G06F 8/30 |
| | | | 707/999.103 |
| 2013/0159971 A1* | 6/2013 | Gieselmann | G06F 8/30 |
| | | | 717/120 |

OTHER PUBLICATIONS

Author Unknown, "Metadata-as-Code," Hackolade, accessed Dec. 9, 2021 from https://hackolade.com/metadata-as-code.html, 5 pages.
Hafidhoh, N. et al., "Source Code Generator for Automating Business Rule Implementation," 2015 International Conference on Data and Software Engineering (ICoDSE), Nov. 25-26, 2015, Yogyakarta, Indonesia, IEEE, 6 pages.
Ludtke, D. et al., "A Framework to Model Metadata for Knowledge Management Tools," International Conference on Knowledge Management for Space Missions (Toulouse Space Show), vol. 4, Jun. 2012, Toulouse, France, 6 pages.
Vacchi, E., "Kogito 1.0: Build-Time Optimized Business Automation in the Cloud," Dec. 4, 2020, https://blog.kie.org/2020/12/kogito-1-0-build-time-optimized-business-automation-in-the-cloud.html, 4 pages.

* cited by examiner

Primary Examiner — Qing Chen
(74) Attorney, Agent, or Firm — Dority & Manning, P.A.

(57) ABSTRACT

In various examples disclosed herein, provided is a method for generating metadata to facilitate code generation. The method can include receiving a first file that includes information relating to a first set of components in a first notation syntax and a second file that includes information relating to a second set of components in a second notation syntax. The method can also include cross-validating the first file and the second file to determine that a first reference, in a first component of the first set of components, to a second component of the second set of components is valid. The method can also include generating a first metadata file that includes identification information relating to the first reference. The method can also include generating code to be executed based on the first metadata file, the first file, and the second file.

20 Claims, 6 Drawing Sheets

GENERATING METADATA TO FACILITATE CODE GENERATION

BACKGROUND

Business automation is a technological area of growing interest and importance that facilitates the implementation of a business application on a computing system via a standardized notation system.

SUMMARY

In various examples disclosed herein, provided is a method and system for generating metadata to facilitate code generation. The system can generate respective metadata files for different files that are associated with different business process modeling and notation syntaxes to facilitate the interoperability of the files. The files, or business assets, can include representations of tasks that are organized differently and differ in format and semantics. The metadata can provide information about references in components (decision services or processes identified in the files) of one file to components of another file. If any changes are made to the underlying files, the metadata for the underlying file can be updated, and the code associated solely with the changed file can be updated without preprocessing all the files again. This incremental preprocessing is faster and requires fewer computing resources than preprocessing all the files every time one or more of the files are modified.

In an example, a method includes receiving, by a computing system comprising one or more processor devices of one or more computing devices, a first file comprising information relating to a first set of components in a first notation syntax and a second file comprising information relating to a second set of components in a second notation syntax. The method also includes cross-validating the first file and the second file to determine that a first reference, in a first component of the first set of components, to a second component of the second set of components is valid. The method also includes generating a first metadata file comprising identification information relating to the first reference. The method also includes generating code to be executed based on the first metadata file, the first file, and the second file.

In an example, a computing system includes one or more computing devices, the one or more computing devices comprising one or more processor devices, the one or more processor devices to receive a first file comprising information relating to a first set of components in a first notation syntax and a second file comprising information relating to a second set of components in a second notation syntax. The processor devices also cross-validate the first file and the second file to determine that a first reference, in a first component of the first set of components, to a second component of the second set of components is valid. The processor devices also generate a first metadata file comprising identification information relating to the first reference. The processor devices also generate code to be executed based on the first metadata file, the first file, and the second file.

In an example, a non-transitory computer-readable storage medium includes executable instructions to cause one or more processor devices of one or more computing devices to receive a first file comprising information relating to a first set of components in a first notation syntax and a second file comprising information relating to a second set of components in a second notation syntax. The instructions further cause the one or more processor devices to cross-validate the first file and the second file to determine that a first reference, in a first component of the first set of components, to a second component of the second set of components is valid. The instructions further cause the one or more processor devices to generate a first metadata file comprising identification information relating to the first reference. The instructions further cause the one or more processor devices to generate code to be executed based on the first metadata file, the first file, and the second file.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
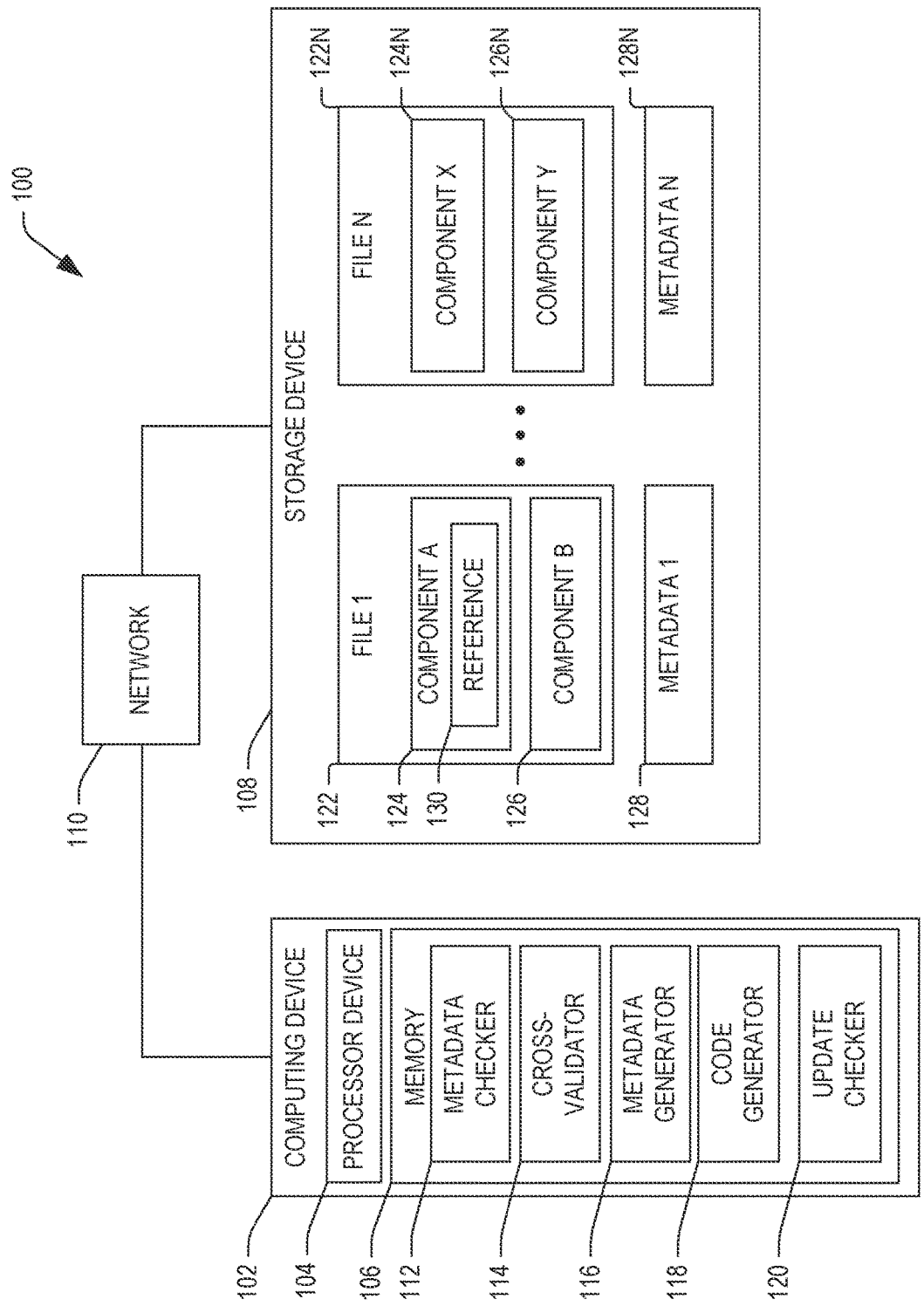
FIG. 1 illustrates a block diagram of an example computing system for generating metadata to facilitate code generation in accordance with various aspects of the subject disclosure.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but, unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

The term "business automation" as used herein refers to the use of predetermined modeling and notation systems that facilitate the modeling of business processes and/or decision services for visualization purposes, and also facilitate the implementation of such business processes and decision services through software instructions that, when interpreted, or compiled and executed, implement a desired business system on one or more computing devices.

Business process modeling is the activity of representing the processes of an enterprise, where the processes can be a series of tasks, events, conditions, and other activities that are recorded and tracked in a manner that can enable analysts to better understand the systems and operations of the enterprise. There are many different methodologies and notation systems that can be used to track, model, and simulate the processes, and, in a cloud-oriented business process automation platform, these can lead to a large set of heterogenous source files that are not necessarily interoperable. Even files that use the same methodology or notation system may not be interoperable since the files may contain references to different files that are not compatible.

During business process modeling, the operational specifications of business processes can be captured, and the data of business processes, known as "artifacts," can be described by characterizing business-relevant data objects, their lifecycles, and related services. Business process modeling tools provide business users with the ability to model their business processes, implement and execute those models, and refine the models based on as-executed data. As a result, business process modeling tools can provide transparency into business processes, as well as the centralization of corporate business process models and execution metrics. The business process modeling tools can also enable simulation functionality that allows for pre-execution modeling and simulation to explore "what-if" scenarios with different inputs. Once the modeling and simulation is performed, the files comprising the processes can be utilized at run-time or when performing business process automation.

Examples of such modeling and notation systems include, by way of non-limiting example, Business Process and Model Notation (BPMN), available at www.omg.org, Decision Model and Notation (DMN), available at www.omg.org, Predictive Model Markup Language (PMML), available at www.dmg.org, and Drools Rules Language (DRL), available at www.drools.org. Generally, a file utilizing a modeling and notation system will be referred to herein collectively as a business asset. Each business asset may comprise an individual file that describes and contains software instructions to implement one or more components, such as processes or decision services, and instructions suitable for visualizing in a user interface the one or more components that are implemented by the business asset. Together, a related collection of business assets implement a particular business application that can execute on one or more computing systems to provide desired functionality.

In various examples disclosed herein, a method and system are provided for generating metadata to facilitate code generation. The system can generate respective metadata files for different files that are associated with different business process modeling and notation syntaxes to facilitate the interoperability of the files. The files, or business assets, can include representations of tasks that are organized differently and differ in format and semantics. The metadata can provide information about references in components (decision services or processes identified in the files) of one file to components of another file. If any changes are made to the underlying files, the metadata for the underlying file can be updated, and the code associated solely with the changed file can be updated, instead of preprocessing all the files again. This incremental preprocessing is more efficient, and requires fewer computing resources, than required by preprocessing all files every time any file is modified.

Independent preprocessing of files enables a code generator to update the code only for the files that have either not been compiled yet or whose object code is not outdated with respect to their respective source code. If the code generator did not know where the files had been updated, there would be no guarantee that any files that have components that have references to other file's components would be valid. The metadata can facilitate the incremental preprocessing of files by tracking the updates to the files. Thus, if the metadata for a given file is up to date, the code generator can preprocess a single updated file without updating all the files at once.

Turning now to FIG. 1, illustrated is a block diagram of an example computing system 100 for generating metadata to facilitate code generation. The computing system 100 includes a computing device 102, which in turn includes a processor device 104 and a memory 106. The computing device 102 may include, or be communicatively coupled to, a storage device 108. In some examples, the computing device 102 may access the storage device 108 via a network 110. The memory 106 can include a metadata checker 112, a cross-validator 114, a metadata generator 116, a code generator 118, and an update checker 120.

The storage device 108 can include files 122-122N that each comprise information associated with components 124-124N and 126-126N, as well as metadata 128-128N. The components can be decision services or processes or can represent any steps in a business process, including flow objects (e.g., events, activities, and gateways), connecting objects (e.g., sequence flow, message flow, association), swim lanes, artifacts, decision steps, and other elements of a business process identified in the files 122-122N. It is to be appreciated that, although the files 122-122N are each depicted in FIG. 1 as including 2 components each, this is merely for the sake of simplicity and that the files 122-122N can contain any number of components.

In an example, the files 122-122N can be in one or many different formats, using different modeling and/or notation systems. For example, the files 122-122N can include one or more of DMN files, BPMN files, PMML files, rules files written using DRL, or files using other formats or notation systems. The DMN files can facilitate automated decisioning; the BPMN files can be used to encode business processes; the PMML files can be used to describe predictive models; and the DRL files can comprise information related to a business rule management system.

In an example, the computing device 102 can receive, via the network 110 and from the storage device 108, the files 122-122N in order to generate the metadata 128-128N to facilitate generation of code to be executed at run-time by a business process automation platform. In an example, the files 122-122N can be of the same notation system, but contain information related to the disparate components 124-124N and 126-126N. In other examples, the files 122-122N can be associated with different notation systems (e.g., a DMN file and a BPMN file). The different components 124-124N and 126-126N may use different semantics, different syntax, different names, and different signatures, even if referring to the same steps, resources, or events.

The metadata checker 112 can determine whether the files 122-122N have the associated metadata 128-128N corresponding to each of the files 122-122N. The metadata 128-128N can be stored separately from the files 122-122N or be stored together or even bundled together. In some examples, the metadata 128-128N can be stored in the cloud or in another storage device other than the storage device 108.

If there is no metadata, or if it is out of date, the incremental preprocessing process can begin to generate metadata to facilitate code generation. The cross-validator 114 can determine whether a reference 130, in the component 124, to either of the component 124N or the component 126N is valid. In other examples, the reference 130 can be a part of the component 124 that is referenceable by other components or other parts of either the file 122 or the file 122N. For example, the cross-validator 114 can verify that references to names present in the file 122 or the component 124 are defined within the same file 122 or the same component 124 or within the file 122N or the component 124N, in order to find matching names. For example, if the file 122 is a BPMN type file that refers to a DMN name in the file 122N, it is a valid name if the cross-validator 114 determines that the DMN name exists in the file 122N. If there are mismatches, the cross-validator 114 can generate an error notification indicating the presence and type of mismatch.

The cross-validator 114 can also verify that names present in one file (e.g., the file 122) are used with a compatible signature (e.g., a function is invoked with arguments of the right types). For example, if the file 122 refers to DMN Determine_Student_Loan_Eligibility in the file 122N, then the reference 130 is valid, if in the file 122, the signature associated with the name Determine_Student_Loan_Eligibility accepts the list of variables associated with the name (e.g., "Age: integer, Year: integer, School: string"). If there are mismatches, the cross-validator 114 can generate an error notification indicating the mismatches.

Once the files 122-122N are cross-validated and the reference 130, in the component 124 to the component 124N or the component 126N, is determined to be valid, the metadata generator 116 can generate the metadata 128 that includes identification information relating to the reference 130. The metadata 128 generated by the metadata generator 116 can be information that is useful for further processing, and the body of the metadata 128 can be specific to the modeling and notation system associated with the file 122. For example, if the file 122 were a DMN syntax file, the information collected would relate to exported decision services along with their signatures (e.g., data types that are expected as inputs, as well as the data types that will be returned as a result). If the file 122 were a PMML syntax file, the information collected could be related to several different predictive models, each with specific inputs and outputs.

In an example where the file 122 is a BPMN syntax file, the information collected could support different start nodes, for example, the start nodes being triggered by messages or specific process variables. The information could also relate to which nodes wait on input when they reach a user task, or the input could be part of the exported information, as well as the name and types of these nodes and tasks, that represents possible entry points of the BPMN (i.e., places from which execution can start or resume).

In an example where the file 122 is a DRL syntax file, the information collected could relate to rules that specify the way the system reacts when data is inserted into the system or could relate to queries that specify the way data from the system is to be pulled.

In an example, the metadata 128 can also include information related to a location (e.g., a uniform resource locater) of the component 124 and any other components referenced in the reference 130 (e.g., components 124N, 126N, etc.). In an example, the metadata 128 can include an asset identifier such as a file name, a path, or a tuple of values defined in the file 122. In another example, the metadata 128 can include information relating to a group of labels and/or process variables and types associated with labels of the file 122 that are referenced by the file 122N. In another example, the metadata 128 can include domain specific information identifying a portion of the file 122 that is solely associated with the modeling and notation syntax associated with the file 122. The domain specific information can enable the code generator 118 to identify components that have no equivalent in other formats or that are only useful for internal purposes (e.g., conditions in a rule, non-exported decisions in a DMN, etc.), for instance, to enable incremental processing at a finer-grained level than a single file (e.g., one single rule etc.).

Once the metadata 128 is generated, the code generator 118 can generate code to be executed based on the metadata 128 and the files 122-122N. The code generated by the code generator 118 can be executed at a later time by a business process automation platform. The code generator 118 can generate any type of executable code and is not limited to creating executable representations of the original files 122-122N. The code generated by the code generator 118 can include (but not be limited to): representational state transfer (REST) endpoints, adapters for message receivers and producers (e.g., for cloud events), adapters for KNative events (e.g., on a Kogito® business process automation platform), Java mappings for data model representations, automated unit tests for REST endpoints, automated integration tests for the message adapters, generation of REST application programming interface (API) specification/manifests (OpenAPI), automated documentation of the business asset (e.g. entry points of a BPMN, decision services of a DMN, etc.), Kubernetes deployment templates, security policies and run-time validation through keycloak (e.g., in BPMN authorized users to a service/user task), and many other types of code.

The update checker 120 can monitor the files 122-122N for updates and, in response to detecting a change to one or more of the components 124-124N and 126-126N, can prompt the cross-validator 114, the metadata generator 116, and the code generator 118 to cross-validate the files 122-122N and generate updated metadata, and, in some examples, the update checker 120 prompts the cross-validator 114 to update the code generated by the code generator 118 to be executed at a later time. For example, if the update checker 120 determines that an update were made to the component 126N, instead of preprocessing all the files 122-122N, the metadata generator 116 can instead update only the metadata 128N. In an example, the code generator 118 can also preprocess and generate code associated with file 122N without preprocessing the file 122. If the update checker 120 determines that no modifications to the files 122-122N have been made since the metadata 128-128N was last generated, or determine that the metadata 128-128N is otherwise up-to-date, the update checker 120 can inhibit or prevent the metadata generator 116 from updating the metadata 128-128N.

Because the metadata checker 112, the cross-validator 114, the metadata generator 116, the code generator 118, and the update checker 120 are components of the computing device 102, functionality implemented by the metadata checker 112, the cross-validator 114, the metadata generator 116, the code generator 118, and the update checker 120 may be attributed to the computing device 102 generally. Moreover, in examples where the metadata checker 112, the cross-validator 114, the metadata generator 116, the code generator 118, and the update checker 120 comprise software instructions that program a processor device (e.g., the processor device 104) to carry out functionality discussed herein, functionality implemented by the metadata checker 112, the cross-validator 114, the metadata generator 116, the code generator 118, and the update checker 120 may be attributed herein to the processor device 104 of the computing device 102.

Finally, it is noted that while, for purposes of illustration and simplicity, the examples are illustrated as being implemented by a computing system that comprises a single computing device that, in turn, comprises a single processor device, in practice the examples disclosed herein may be implemented in a computing system that comprises any number of computing devices, each of which may comprise one or more processor devices. Thus, irrespective of the implementation, the examples may be implemented on a computing system that includes one or more computing devices, wherein the one or more computing devices comprise one or more processor devices, and wherein the one or more processor devices are configured to implement functionality disclosed herein.

Figure 2:
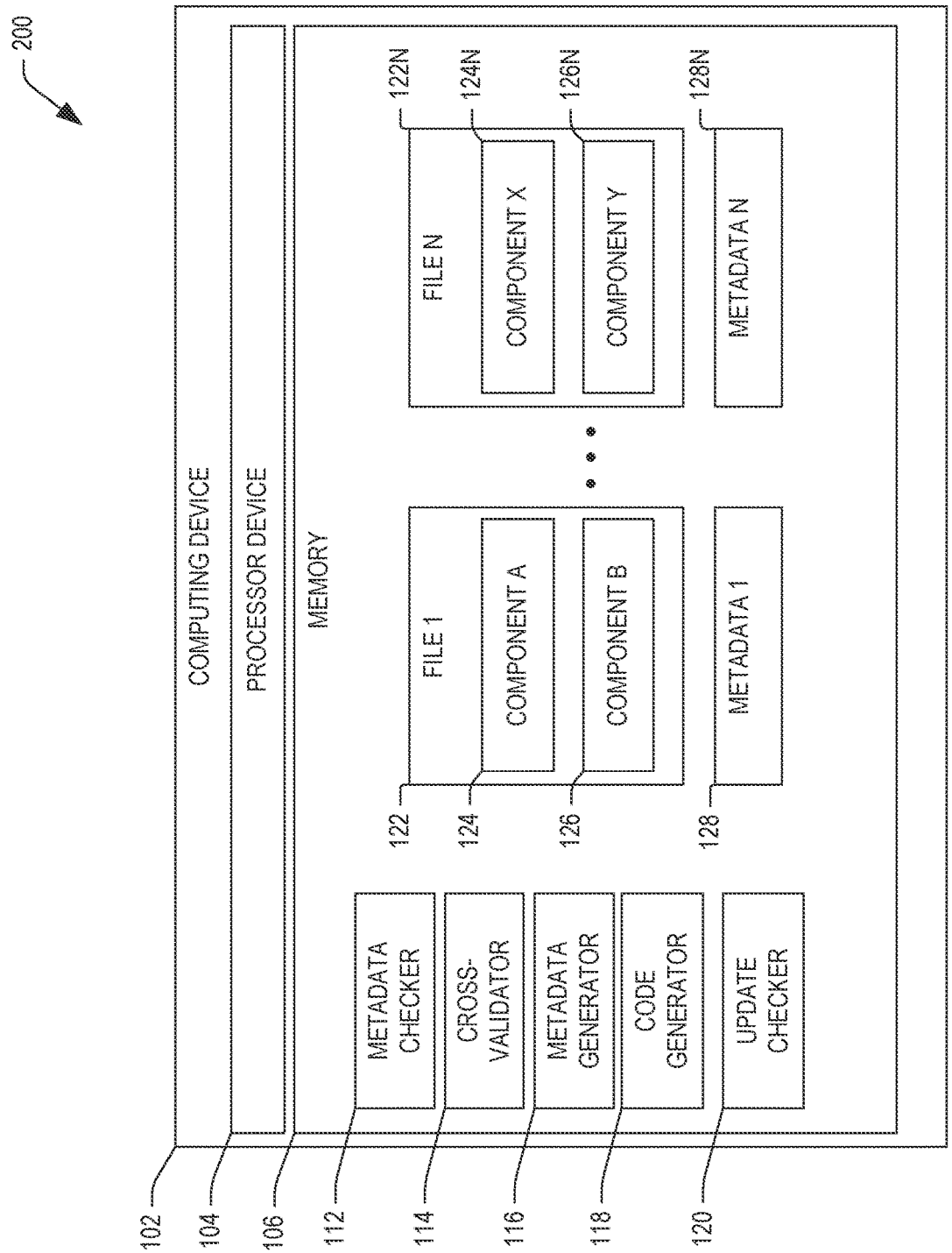
FIG. 2 illustrates a block diagram of an example computing system for generating metadata to facilitate code generation in accordance with various aspects of the subject disclosure.

Turning now to FIG. 2, illustrated is a block diagram of an example computing system 200 for generating metadata to facilitate code generation in accordance with various aspects of the subject disclosure. The system 200 in FIG. 2 depicts a different configuration of the computing system 100 shown in FIG. 1. Instead of the storage device 108 being separate from the computing device 102, and communicatively coupled via the network 110, in the example shown in FIG. 2, the files 122-122N can be stored in the memory 106 or in a storage device within the computing device 102.

Figure 3:
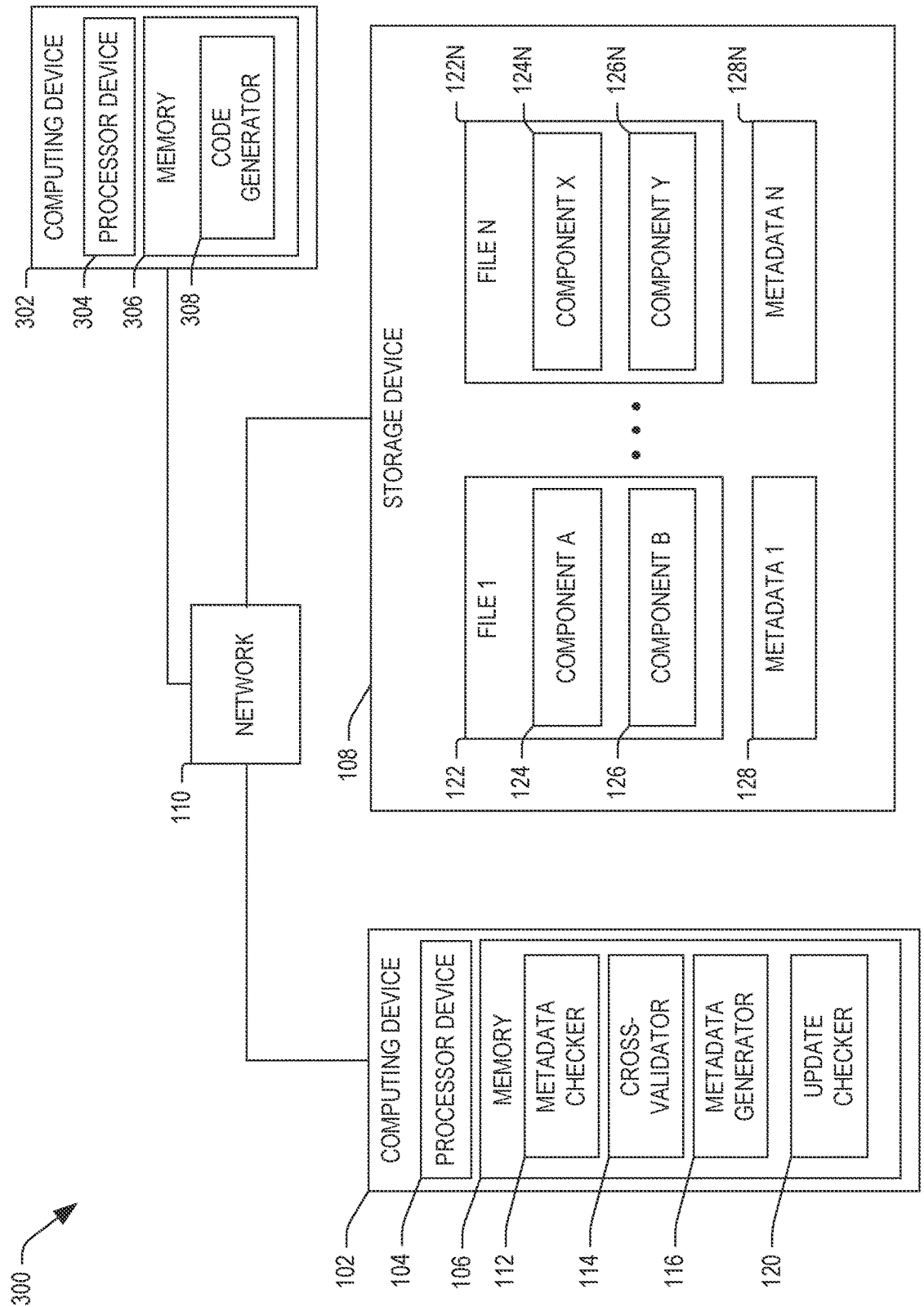
FIG. 3 illustrates a block diagram of an example computing system for generating metadata to facilitate code generation in accordance with various aspects of the subject disclosure.

In FIG. 3, illustrated is a block diagram of an example computing system 300 for generating metadata to facilitate code generation in accordance with various aspects of the subject disclosure. The computing system 300 in FIG. 3 depicts a different configuration of the computing system 100 shown in FIG. 1.

In the computing system 300, the computing device 102 can perform all the steps of the process through generating metadata and checking for updates to the metadata, and then, a computing device 302 can be provided to generate code for run-time execution. The computing device 302 can include a processor device 304 and a memory 306 that can store a code generator 308 that generates the code to be executed. In other examples, the division of the phases of generating metadata and generating code can be split up differently, with one or more computing devices performing cross-validation and metadata generation, and with another computing device performing code generation and update checking.

Figure 4:
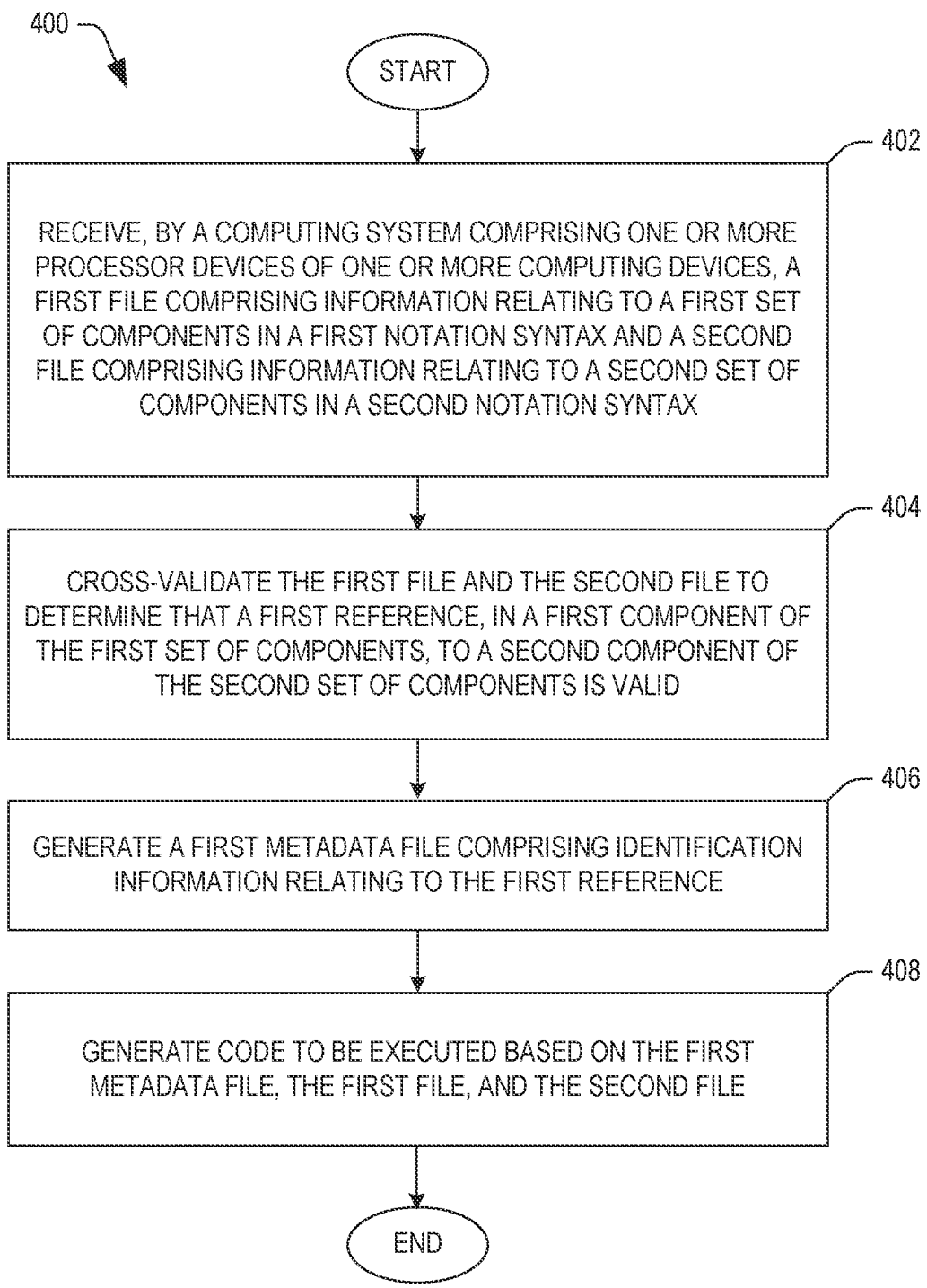
FIG. 4 illustrates a flowchart of an example method for generating metadata to facilitate code generation in accordance with various aspects of the subject disclosure.

FIG. 4 illustrates a process in connection with the aforementioned computing systems 100, 200, and/or 300. FIG. 4 will be discussed in conjunction with FIG. 1. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 4, illustrated is a flowchart of an example method 400 for generating metadata to facilitate code generation.

At step 402, the method 400 can include receiving, by the computing device 102 comprising one or more processor devices (e.g., the processor device 104) of one or more computing devices, a first file (e.g., the file 122) comprising information relating to a first set of components (e.g., the components 124 and 126) in a first notation syntax (e.g., BPMN syntax) and a second file (e.g., the file 122N) comprising information relating to a second set of components (e.g., the components 124N and 126N) in a second notation syntax (e.g., DMN syntax).

At step 404, the method 400 can include cross-validating (e.g., by the cross-validator 114) the first file 122 and the second file 122N to determine that the first reference 130 in a first component 124, of the first set of components 124-126, to a second component 124N of the second set of components 124N-126N is valid.

At step 406, the method 400 can include generating a first metadata file 128 by the metadata generator 116, the first metadata file 128 comprising identification information relating to the first reference 130.

At step 408, the method 400 can include generating code by the code generator 118 to be executed based on the first metadata file 128, and the first file 122, and the second file 122N.

Figure 5:
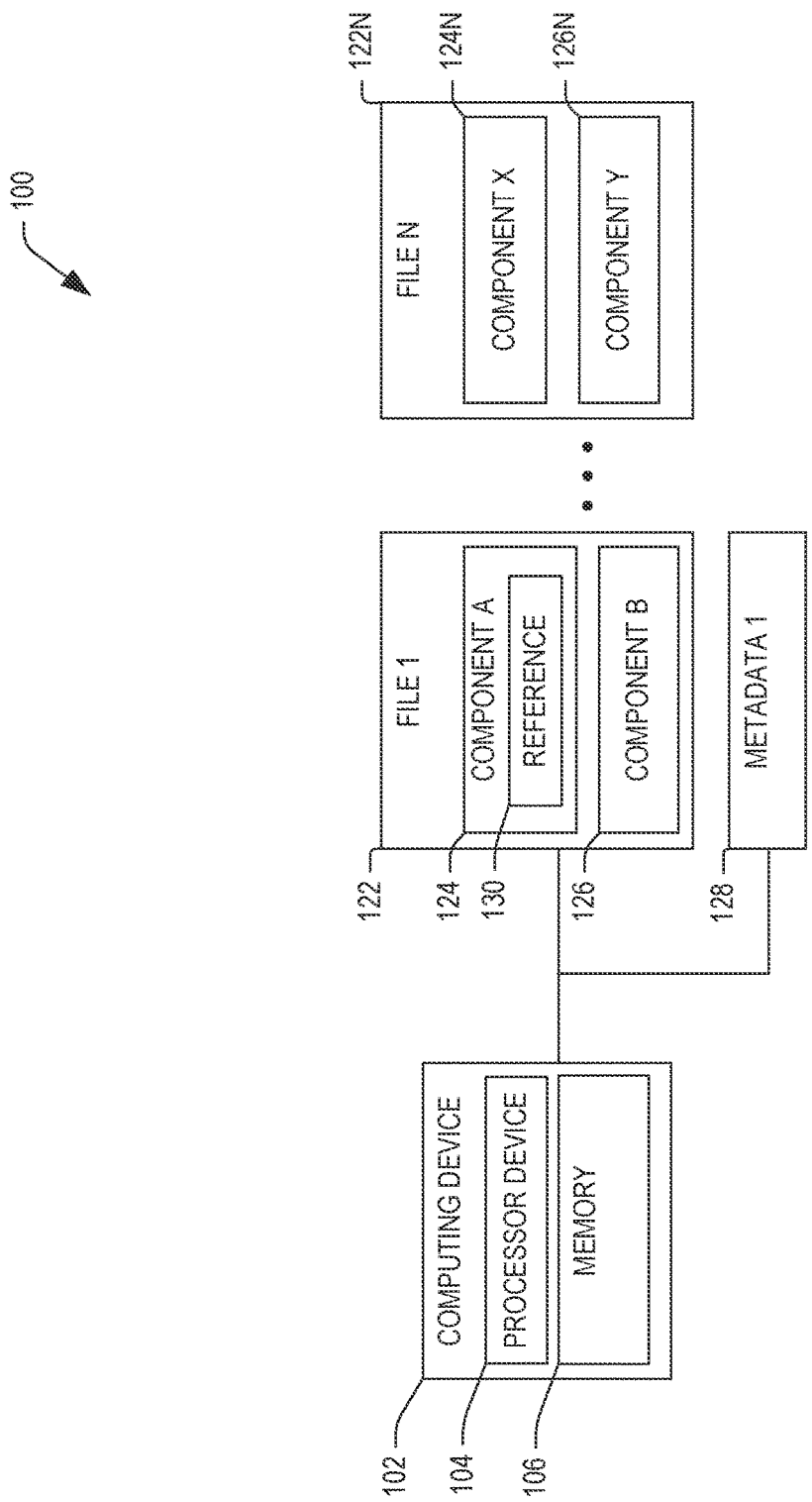
FIG. 5 is a simplified block diagram of the computing system illustrated in FIG. 1 in accordance with various aspects of the subject disclosure.

FIG. 5 is a simplified block diagram of the computing system 100 illustrated in FIG. 1 in accordance with various aspects of the subject disclosure. The computing system 100 includes the computing device 102 that includes the memory 106 coupled to the processor 104. The processor device 104 is to receive the first file 122 comprising information relating to the first set of components 124-126 in a first notation syntax and the second file 122N comprising information relating to the second set of components 124N-126N in a second notation syntax. The processor device 104 is further to cross-validate the first file 122 and the second file 122N to determine that the first reference 130, in the first component 124 of the first set of components 124-126, to the second component 124N of the second set of components 124N-126N is valid. The processor device 104 is further to generate the first metadata file 128 comprising identification information relating to the first reference 130. The processor device 104 also generates code to be executed based on the first metadata file 128, the first file 122, and the second file 122N.

Figure 6:
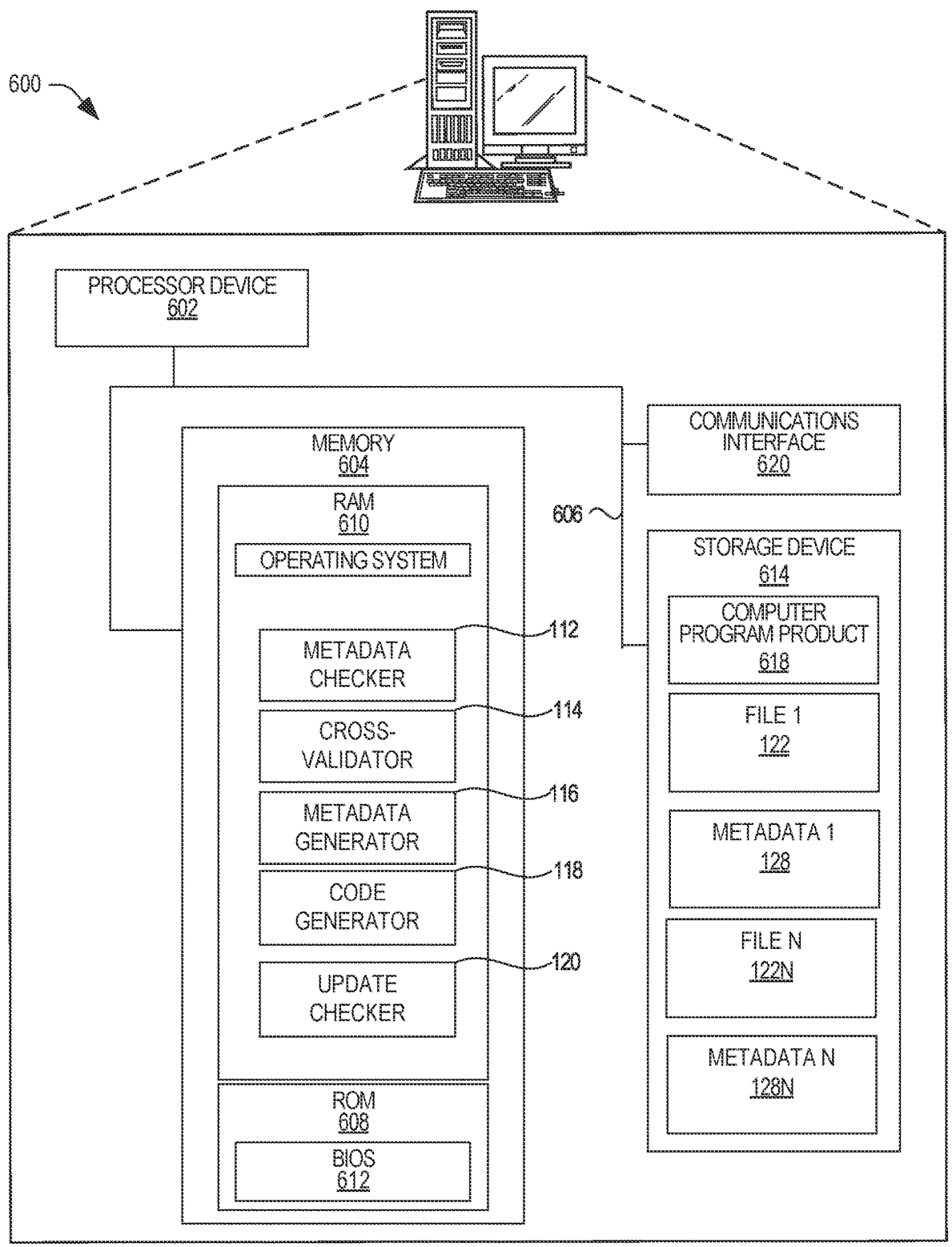
FIG. 6 illustrates an example block diagram of a computer that can be operable to execute processes and methods in accordance with various aspects of the subject disclosure.

FIG. 6 is a block diagram of a computing device 600 suitable for implementing the computing device 102 according to one example. The computing device 600 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 600 includes a processor device 602, a system memory 604, and a system bus 606. The system bus 606 provides an interface for system components including, but not limited to, the system memory 604 and the processor device 602. The processor device 602 can be any commercially available or proprietary processor.

The system bus 606 may be any of several types of bus structures that may further interconnect to a memory bus (with or without a memory controller), a peripheral bus, and/or a local bus using any of a variety of commercially available bus architectures. The system memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)). A basic input/output system (BIOS) 612 may be stored in the non-volatile memory 608 and can include the basic routines that help to transfer information between elements within the source computing device 600. The volatile memory 610 may also include a high-speed RAM, such as static RAM, for caching data.

The computing device 600 may further include or be coupled to a non-transitory computer-readable storage medium such as a storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 614 and in the volatile memory 610, including an operating system and one or more components, such as the metadata checker 112, the cross-validator 114, the metadata generator 116, the code generator 118, and the update checker 120 if the computing device 600 is implementing the computing device 102. Such components may implement the functionality described herein in whole or in part. It is to be appreciated that the examples can be implemented with various commercially available operating systems or combinations of operating systems.

The files 122-122N and the metadata 128-128N can also be stored in the storage device 614. All or a portion of the examples may be implemented as a computer program product 618 stored on a transitory or non-transitory computer-usable or computer-readable storage medium, such as the storage device 614, which includes complex programming instructions, such as complex computer-readable program code, to cause the processor device 602 to carry out the steps described herein. Thus, the computer-readable program code can comprise software instructions for implementing the functionality of the examples described herein when executed on the processor device 602.

The computing device 600 may also include a communications interface 620 suitable for communicating with a mobile wireless network or other computing devices as appropriate or desired.

Those skilled in the art will recognize improvements and modifications to the preferred examples of the disclosure. All such improvements and modifications are considered within the scope of the concepts disclosed herein and the claims that follow.

What is claimed is:

1. A method comprising:
   receiving, by a computing system comprising one or more processor devices of one or more computing devices, a first file comprising information relating to a first set of components in a first notation syntax and a second file comprising information relating to a second set of components in a second notation syntax;
   cross-validating the first file and the second file to determine that a first reference, in a first component of the first set of components, to a second component of the second set of components is valid;
   generating a first metadata file comprising identification information relating to the first reference;
   generating code to be executed based on the first metadata file, the first file, and the second file; and
   executing the generated code.

2. The method of claim 1, further comprising:
   determining an existence of a second metadata file comprising identification information relating to a second reference associated with the second set of components; and
   in response to determining the existence of the second metadata file, inhibiting an update to the second metadata file.

3. The method of claim 1, further comprising:
   determining that the first reference in the first component of the first set of components has been updated; and
   updating the first metadata file to include updated identification information relating to the first reference to generate a first updated metadata file.

4. The method of claim 3, further comprising:
   generating updated code to be executed based on the first updated metadata file, the first file, and the second file; and
   executing the generated updated code.

5. The method of claim 1, further comprising:
   determining that the second file has been updated, causing the first reference in the first component of the first set of components to be out of date; and
   updating the first metadata file to include updated identification information relating to the first reference to generate a first updated metadata file.

6. The method of claim 5, further comprising:
   generating updated code to be executed based on the first updated metadata file, the first file, and the second file; and
   executing the generated updated code.

7. The method of claim 1, wherein the identification information relating to the first reference comprises a first location information relating to the first component of the first set of components, and a second location information relating to the second component of the second set of components.

8. The method of claim 1, wherein the first metadata file comprises information relating to a group of labels associated with the first file that are referenced by another file.

9. The method of claim 8, wherein the first metadata file comprises a plurality of process variables and a plurality of types associated with the group of labels.

10. The method of claim 1, wherein the first metadata file comprises domain specific information identifying a portion of the first file solely associated with the first notation syntax.

11. The method of claim 1, wherein at least one of the first notation syntax and the second notation syntax is at least one of Decision Modeling and Notation (DMN) syntax, Business Process Model Notation (BPMN) syntax, Predictive Model Markup Language (PMML) syntax, and Drools Rule Language (DRL) syntax.

12. A computing system comprising:
one or more computing devices, the one or more computing devices comprising one or more processor devices, the one or more processor devices to:
receive a first file comprising information relating to a first set of components in a first notation syntax and a second file comprising information relating to a second set of components in a second notation syntax;
cross-validate the first file and the second file to determine that a first reference, in a first component of the first set of components, to a second component of the second set of components is valid;
generate a first metadata file comprising identification information relating to the first reference;
generate code to be executed based on the first metadata file, the first file, and the second file; and
execute the generated code.

13. The computing system of claim 12, wherein the one or more processor devices further:
determine an existence of a second metadata file comprising identification information relating to a second reference associated with the second set of components; and
in response to determining the existence of the second metadata file, inhibit an update to the second metadata file.

14. The computing system of claim 12, wherein the one or more processor devices further:
determine that the first reference in the first component of the first set of components has been updated; and
update the first metadata file to include updated identification information relating to the first reference to generate a first updated metadata file.

15. The computing system of claim 14, wherein the one or more processor devices further:
generate updated code to be executed based on the first updated metadata file, the first file, and the second file; and
execute the generated updated code.

16. The computing system of claim 12, wherein the one or more processor devices further:
determine that the second file has been updated, causing the first reference in the first component of the first set of components to be out of date; and
update the first metadata file to include updated identification information relating to the first reference to generate a first updated metadata file.

17. The computing system of claim 16, wherein the one or more processor devices further:
generate updated code to be executed based on the first updated metadata file, the first file, and the second file; and
execute the generated updated code.

18. The computing system of claim 12, wherein the identification information relating to the first reference comprises a first location information relating to the first component of the first set of components, and a second location information relating to the second component of the second set of components.

19. The computing system of claim 12, wherein the first metadata file comprises:
information relating to a group of labels associated with the first file that are referenced by another file; and
a plurality of process variables and a plurality of types associated with the group of labels.

20. A non-transitory computer-readable storage medium that includes executable instructions to cause one or more processor devices of one or more computing devices to:
receive a first file comprising information relating to a first set of components in a first notation syntax and a second file comprising information relating to a second set of components in a second notation syntax;
cross-validate the first file and the second file to determine that a first reference, in a first component of the first set of components, to a second component of the second set of components is valid;
generate a first metadata file comprising identification information relating to the first reference;
generate code to be executed based on the first metadata file, the first file, and the second file; and
execute the generated code.

* * * * *